June 26, 1928.  
E. R. BURTNETT  
INTERNAL COMBUSTION ENGINE  
Original Filed Sept. 25, 1924    2 Sheets-Sheet 2
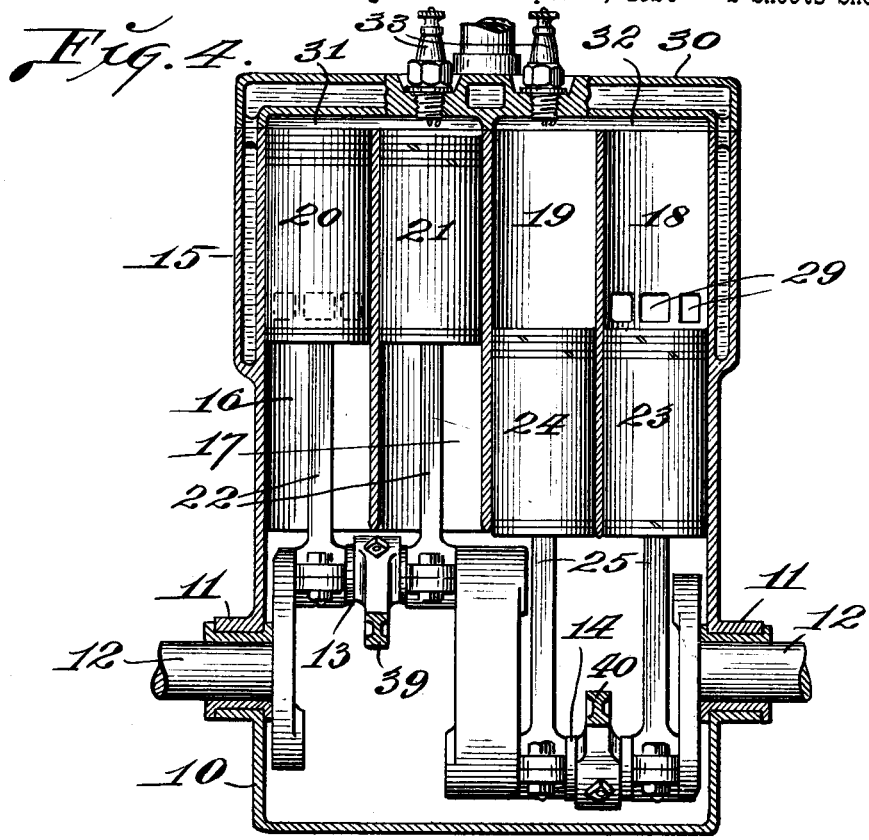
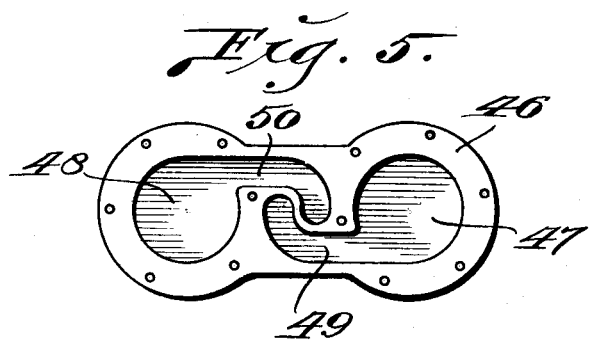
INVENTOR,  
E. R. Burtnett,  
By Martin P. Smith ATTY.

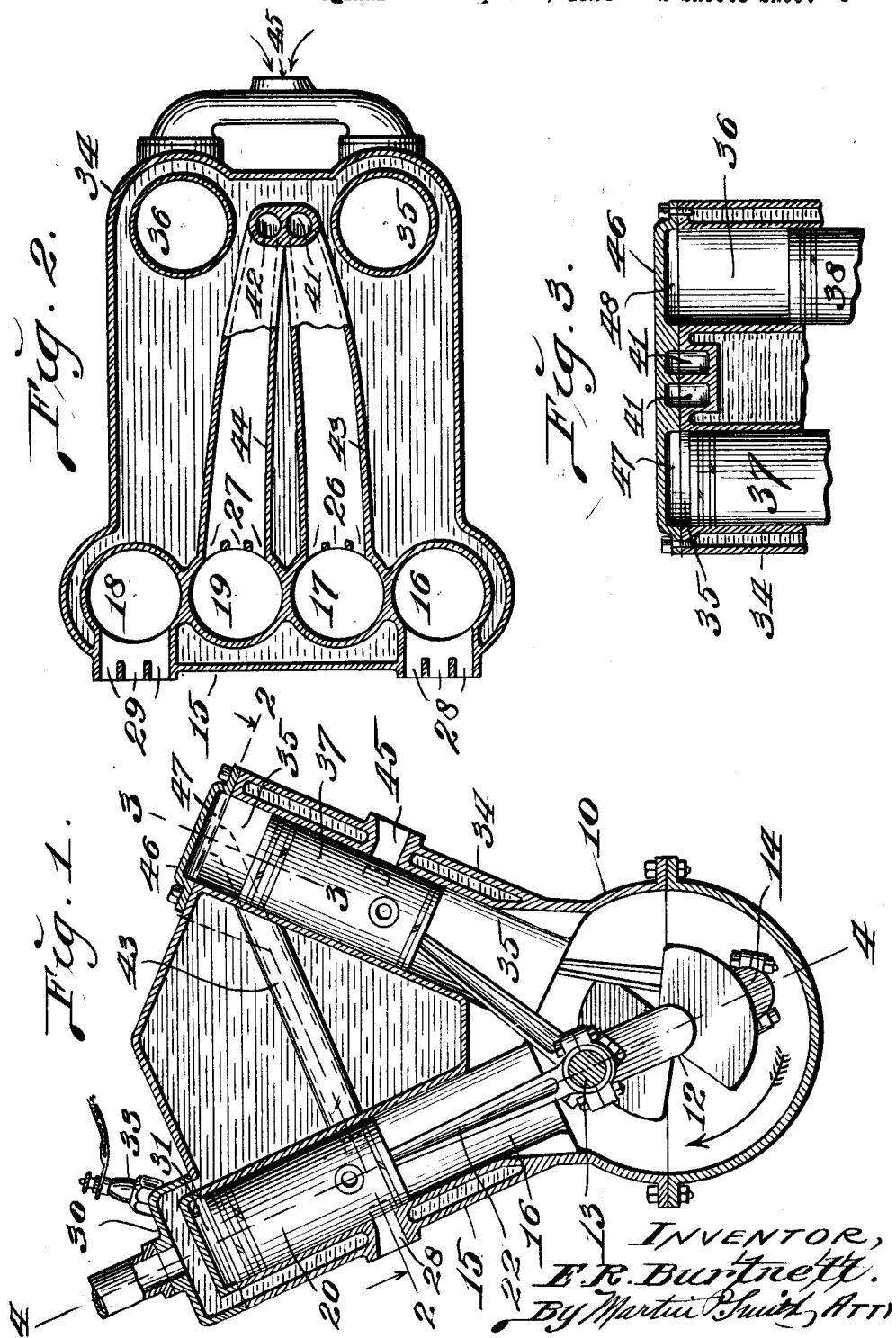

Patented June 26, 1928.

1,674,818

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed September 25, 1924, Serial No. 739,913. Renewed March 3, 1927.

My invention relates to internal combustion engines of the two stroke cycle type, the principal objects of my invention being to generally improve upon and simplify the construction of two stroke cycle engines and to provide a strong rugged valveless engine having a plurality of combustion cylinders and a plurality of gaseous fuel precompression or pumping cylinders, the two sets of cylinders being disposed in V-arrangement and the various moving parts being constructed and disposed so as to provide a balanced rotative and reciprocative mechanical structure, which latter provision, it will be understood, tends to eliminate vibration and produces a highly efficient power producing unit.

A further object of my invention is to provide a working cycle unit of six cylinders, four of which are arranged in row and function as combustion and power cylinders, the other two cylinders being arranged in row and disposed at an angle relative to the combustion cylinders and functioning as gaseous fuel precompression or pumping cylinders, to provide a two-throw crank shaft for said engine, the cranks or throws of which are disposed substantially 180° apart, and to provide a separate connection from each of the six pistons within the cylinders and the two throws or cranks of said crank shaft.

In my improved engine, the pistons of two of the four combustion cylinders and the piston of one of the two pumping cylinders are connected to one of the two throws of the crank shaft, and the pistons within the two other combustion cylinders and other pump cylinder are connected to the other one of the two throws of said crank shaft. Inasmuch as the two throws of the crank are arranged 180° apart and the two pairs of combustion cylinders are arranged in a row parallel with the axis of the crank shaft with the pistons in one pair of combustion cylinders connected to one crank throw and the pistons in the other pair of combustion cylinders connected to the other crank throw, two symmetrical and balanced reciprocating masses are provided, and thus a balanced rotative and reciprocative mechanical structure is produced in so far as the combustion cylinder structure is concerned.

The two pump cylinders are arranged in a row parallel with the axis of the crank shaft with the piston in one cylinder connected to one of the two throws of the crank shaft and the piston in the other pump cylinder connected to the other one of the two throws of the crank shaft, thereby providing a balanced reciprocative and rotative mechanical structure for the operating parts associated with the pumping or gaseous fuel precompression cylinders.

With the foregoing and other objects in view, my invention consists in the features of construction and combination and arrangement of parts hereinafter more fully described and claimed, reference being had to the accompanying drawings, wherein:

Figure 1 is a transverse vertical section taken through the central portion of an internal combustion engine of my improved construction;

Figure 2 is a section taken approximately on the line 2—2 of Figure 1;

Figure 3 is a detail section taken approximately on the line 3—3 of Figure 1;

Figure 4 is a vertical section taken approximately on the line 4—4 of Figure 1; and Figure 5 is a view looking against the under side of the head of the gaseous fuel precompression or pumping cylinders.

Referring by numerals to the accompanying drawings, which illustrate a practical embodiment of my invention, 10 designates a crank case of standard form, which may be constructed in two or more parts, and arranged on the end walls thereof are bearings 11 for a crank shaft 12, the latter having two cranks or throws 13 and 14, which throws are disposed diametrically opposite to each other or 180° apart. Formed integral with or fixed to the upper portion of the crank case and on one side of a vertical plane passing through the center of said crank case is a block 15 in which are formed four combustion chambers 16, 17, 18 and 19. These cylinders are arranged in a row that is parallel with the axis of the crank shaft and the axes of all of the combustion chambers intersect the axis of said crank shaft.

Pistons 20 and 21 are arranged for operation within combustion chambers 16 and 17, said pistons being connected by suitable connecting rods 22 to crank throw 13. Similar pistons 23 and 24 are arranged for operation, respectively, within combustion chambers 18 and 19, and said pistons are connected by suitable connecting rods 25 to crank throw 14.

Combustion chambers 17 and 19 are provided, respectively, with gaseous fuel inlet ports 26 and 27, the same being located so that they are wholly uncovered and open only when the pistons 21 and 24 that operate within said combustion chambers are at the outer ends of their travel. Formed through the wall of block 15 and surrounding combustion cylinders 16 and 18 are exhaust ports 28 and 29, the latter being located in the same plane with the fuel inlet ports 26 and 27, so that they are wholly uncovered and open only when pistons 20 and 23 are at the outer or lower ends of their travel. Secured in any suitable manner on the head end of block 15 and closing the upper ends of all of the combustion chambers is a head block 30, and formed in the under side thereof are shallow chambers or pockets 31 and 32. Chamber 31 connects and serves as common clearance space for the combustion chambers 16 and 17, and in like manner chamber 32 connects and serves as a common clearance chamber for the combustion chambers 18 and 19. Seated in head 30, preferably at points above the combustion chambers 17 and 19 that are provided with the gaseous fuel inlet ports 26 and 27, are ignition devices, preferably spark plugs, such as 33, and the inner ends of the terminals of the electrodes of these plugs project into the common clearance chambers 31 and 32.

Formed on the upper portion of crank case 10 and on the opposite side of a vertical plane passing through the axis thereof from the row of combustion cylinders just described is a block 34 in which are formed two gaseous fuel pre-compression and pumping chambers 35 and 36. The axes of these pumping cylinders intersect the axis of the crank shaft, so that the two cylinder blocks 15 and 34 constitute a V-structure with the block 34 behind or to the rear of block 15 in the direction of crank rotation. In other words, as the crank shaft rotates clockwise, the cranks thereof pass beneath the row of combustion cylinders before passing beneath the row of pumping cylinders. The angularity between the two rows of cylinders must be such that when the piston within each pumping cylinder reaches top or inner dead center the pistons within the corresponding pair of combustion cylinders will have moved a sufficient distance from the outer or bottom dead center to close the induction or inlet ports through which the gaseous fuel is forced by said pumping cylinder into its pair of combustion cylinders. This provision effectually prevents a portion of the inducted gaseous fuel charge to the combustion cylinders from returning to the pumping cylinder.

Arranged for reciprocatory movement within the pumping chambers 35 and 36 are pistons 37 and 38, Fig. 3, respectively, piston 37 being connected by a suitable connecting rod 39 to crank 13 between the connecting rods 22, piston 38 being connected by a suitable connecting rod 40 to crank 14 between the connecting rods 25. Inasmuch as the cranks 13 and 14 are arranged diametrically opposite to each other, the pumping pistons 37 and 38 will operate simultaneously but in opposite directions.

Formed in the upper portion of block 34, between the pumping cylinders 35 and 36, are short vertically disposed pockets or ducts 41 and 42, the lower end of pocket 41 being connected to inlet ports 26 by a precompressed gaseous fuel transfer duct 43, and a corresponding transfer duct 44 connects the lower portion of pocket 42 with the gaseous fuel inlet ports 27.

Formed through the wall of block 34 and leading into the gaseous fuel precompression chambers 35 and 36 are gaseous fuel inlet ports, such as 45, the same being suitably connected to a source of gaseous fuel supply, such as a carbureter, and said ports being located so that they are uncovered and wholly open only when the pumping pistons 37 and 38 are at the outer or lower ends of their travel. Secured in any suitable manner on the head end of block 34 is a head block 46 that closes the gaseous fuel pumping chambers 35 and 36, and formed in the under side of said head block are shallow pockets or clearance chambers 47 and 48. Chamber 47 is disposed directly above and provides a compression clearance chamber for compression chamber 35, and formed in the under side of head 46 and leading from clearance chamber 47 to duct or pocket 42 is a shallow duct 49, Fig. 5. Chamber 48 is disposed directly above and provides a compression clearance chamber for gaseous fuel compression chamber 36, and formed in the under side of head 46 and leading from said clearance chamber 48 to pocket or duct 41 is a duct 50.

By virtue of the arrangement just described, piston 37 operating within chamber 35 functions to precompress gaseous fuel and force the same under pressure through clearance chamber 48, duct 50, pocket 41, duct 43, and transfer ports 26, into combustion chamber 17 and from said chamber the gaseous fuel thus inducted passes through common clearance chamber 31 into combustion chamber 16. In like manner, piston 38, operating within compression chamber 36, functions to compress gaseous fuel and force the same through clearance chamber 47, duct 49, pocket 42, duct 44, and transfer inlet ports 27, into combustion chamber 19, and from thence the compressed gaseous fuel passes through common clearance chamber 32 into combustion chamber 18. Gaseous fuel is admitted to the pumping chambers 35 and 36 through the inlet ports 45 when the pumping pistons pass outer or lower dead centers and on the upward or inward stroke of each pumping piston the charge of gaseous fuel is precompressed in the corresponding compression clearance chamber in head 46 and in the corresponding transfer duct that leads from the pumping cylinders to the pairs of combustion cylinders. The gaseous fuel thus precompressed can only enter the respective pairs of combustion chambers when the pistons therein are at lower or outer dead center and when, for instance, transfer ports 26 are uncovered, the precompressed gaseous fuel will enter combustion chamber 17 and pass upwardly therethrough, thence through common clearance chamber 31, thence downwardly through combustion chamber 16, and in so doing, the greater portion of the products of combustion of the previously ignited charge will be forced out through the exhaust ports 28 as long as the same are open. This induction or supercharging action takes place as the corresponding pumping piston is approaching outer or high center and while the pistons 20 and 21 in the combustion chambers 16 and 17 are moving from outer or lower dead center a sufficient distance for piston 21 to entirely close transfer inlet ports 26, and this entire closing of the ports is brought about coincident with the termination of the upward travel of the corresponding precompression or pumping piston 38. Thus as transfer inlet ports 27 are closed, there can be no return of any of the inducted gaseous fuel charge back through duct 42 as the pumping piston 38 starts downward, and on the continued upward or inward travel of pistons 20 and 21 the gaseous fuel charge mixed with the residual products of combustion remaining in chambers 16 and 17 will be compressed within common clearance chamber 31 until at the point of highest compression or as pistons 20 and 21 pass high center, the compressed charge will be ignited by a spark produced between the terminals of the electrodes of the corresponding spark plug and the expansion resulting from combustion of the compressed fuel charge will act on the heads of the pistons to drive the same downward on their power stroke.

Identically the same action takes place in the precompression of gaseous fuel in chamber 35 and the transfer of said precompressed gaseous fuel through duct 43 to the combustion chambers 18 and 19.

In order that the connecting rods 39 and 40 from the pistons within the pumping cylinders may be conveniently mounted on the cranks of the crank shaft between the pairs of connecting rods 22 and 25, the axis of pumping cylinder 35 occupies a plane that passes midway between the axes of combustion chambers 16 and 17, and the axis of cylinder 36 occupies a plane that passes midway between the axes of the cylinders 18 and 19.

The provision of a two throw crank shaft with the throws arranged diametrically opposite to each other or 180° apart, the arrangement of the pistons within the combustion chambers and pumping chambers, and the connections from said pistons to the two crank throws provides a balanced reciprocative and rotative mechanical structure that minimizes vibration and variable strains and stresses and at the same time is effective in producing a comparatively high degree of engine efficiency.

Efficiency of engine operation is further enhanced by the angular disposition of the two rows of cylinders which effectually prevents the return movement of any of the precompressed gaseous fuel column or volume that is forced from the pumping cylinders into the combustion cylinders.

Thus it will be seen that I have provided a relatively simple, compact and valveless internal combustion engine that operates on the two stroke cycle principle which may be advantageously employed wherever desired for the economical production of power.

Obviously minor changes in the size, form and construction of my improved internal combustion engine may be made without departing from the spirit of my invention, the scope of which is set forth in the appended claims.

I claim as my invention:

1. In a two stroke cycle internal combustion engine, a power unit comprising six cylinders arranged in two rows with four cylinders in one row and adapted to function as combustion or power cylinders, the other two cylinders being arranged in a row and adapted to function for the precompression of gaseous fuel, the four combustion cylinders being arranged in two pairs with the members of each pair connected at their head ends by a common clearance chamber, one member of each pair of combustion chambers being provided with precompressed gaseous fuel inlet ports and the other member of each pair of combustion cylinders being provided with an exhaust port, means for conducting precompressed gaseous fuel from the pumping cylinders to the inlet ports in the combustion cylinders, pistons operating within all of the cylinders, a two throw crank shaft, each throw of said crankshaft having three bearing surfaces, connecting rods between the piston in the pumping cylinders and the intermediate bearing surfaces of the two throws of said crankshaft, connections from the pistons in the two pairs of combustion cylinders and the outer bearing surfaces of the two crank throws of said crankshaft, and the angularity between the two rows of pistons and the piston and crank connections being arranged so that the piston in the combustion cylinders are in position to wholly close the gaseous fuel inlet ports into said combustion cylinders when the corresponding gaseous fuel pumping piston reaches the outer or inner end of its stroke.

2. In a two stroke cycle internal combustion engine, six cylinders, a crank shaft having two crank throws arranged 180° apart, four of the six cylinders being arranged in a row parallel with the axis of the crank shaft and functioning as combustion cylinders, the remaining two cylinders being arranged in a second row parallel with the axis of the crank shaft, the four cylinders forming one row being arranged in pairs, the members of each pair being connected at their head ends by a common clearance chamber, the cylinders forming the second row being arranged parallel with the axis of the crank shaft and adapted to charge pumping, and their axes disposed at an angle to the axes of the combustion cylinders, pistons within each of the six cylinders, the pistons of the first and second cylinders from a given end of the row of combustion cylinders and the piston of the cylinder of the row of two pumping cylinders nearest the given end being connected to one of the two throws of the crank shaft, the connection between the pistons of one of the two pumping cylinders being attached to the crank between the connections from the pistons of the pair of combustion cylinders, there being ports formed in the wall of each of the four combustion cylinders, and a duct leading from each of the pumping cylinders to the ports formed in one member of each pair of combustion cylinders.

3. In a two stroke cycle internal combustion engine, six cylinders, a crank shaft having two crank throws arranged 180° apart, four of the six cylinders being arranged in a row parallel with the axis of the crank shaft and functioning as combustion cylinders, the remaining two cylinders being arranged in a second row parallel with the axis of the crank shaft, the four cylinders forming one row being arranged in pairs, the members of each pair being connected at their head ends by a common clearance chamber, the cylinders forming the second row being arranged parallel with the axis of the crank shaft and adapted to charge pumping and with their axes disposed at an angle to the axes of the combustion cylinders, pistons within each of the six cylinders, the pistons of the first and second cylinders from a given end of the row of combustion cylinders and the piston of the cylinder of the row of two pumping cylinders nearest the given end being connected to one of the two throws of the crank shaft, the connection between the piston of the other of the two pumping cylinders being attached to the crank between the connections from the pistons of the other pair of combustion cylinders, there being ports formed in the wall of each of the four combustion cylinders, and a duct leading from each of the pumping cylinders to the ports formed in one of each pair of combustion cylinders.

4. In a two stroke cycle internal combustion engine, six cylinders, of which four function as combustion cylinders and the other two as pump cylinders, a crank shaft having two throws disposed 180° apart in circumferential relation, a piston within each of the six cylinders, a separate connection between each piston and the crank shaft, the six cylinders being arranged in V-formation to form two rows that are connected on a line parallel with the axis of the crank shaft, four of the said six cylinders forming one row and two cylinders forming another row, the four cylinders forming one row being arranged first in a circumferential plane in the direction of crank shaft rotation, said four cylinders being adapted to combustion, the two cylinders forming the other row being adapted to fuel charge pumping to the combustion cylinders forming the first row in the direction of crank shaft rotation, the four combustion cylinders forming the first row being arranged in two pairs, the first and second cylinders from each end forming a pair, the members of each of the two pairs of combustion cylinders being joined by a compression and combustion clearance chamber common to said two cylinders, thus forming a connected pair, the two pumping cylinders forming the second row being centered on a line parallel with the axis of the crank shaft, exhaust ports formed in the wall of one of each pair of combustion cylinders, inlet ports formed in the wall of the other of the two cylinders forming each pair of combustion cylinders, two gaseous fuel transfer ducts, one leading from the head end of each pumping cylinder to the inlet ports formed in the wall of one of each pair of combustion cylinders for the transfer of the fuel charge from the pump chamber to the combustion chamber, separate connections between the two pistons of the pair of combustion cylinders and one of the two crank throws of the crank shaft, separate connections between the pistons of the other two cylinders located at the other end of the two rows and the other crank throw of said crank shaft and the connections from the pistons within the pumping cylinders being connected to the crankthrows between the connections to the pistons in the combustion cylinders.

In testimony whereof I affix my signature.

EVERETT R. BURTNETT.